Sept. 1, 1936. A. IVANOFF ET AL 2,053,034
METHOD OF AUTOMATIC CONTROL AND AUTOMATIC CONTROL APPARATUS
Filed Dec. 5, 1934
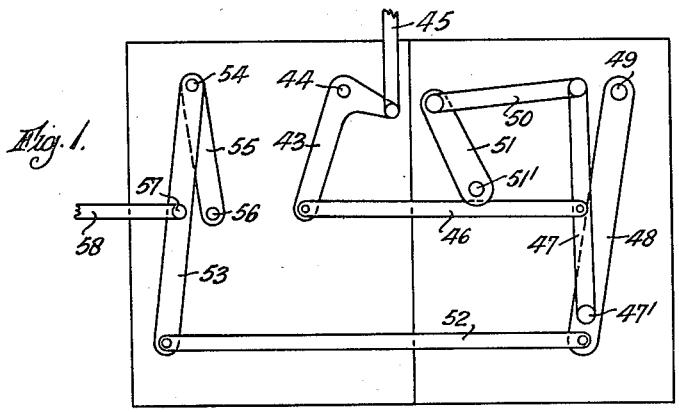
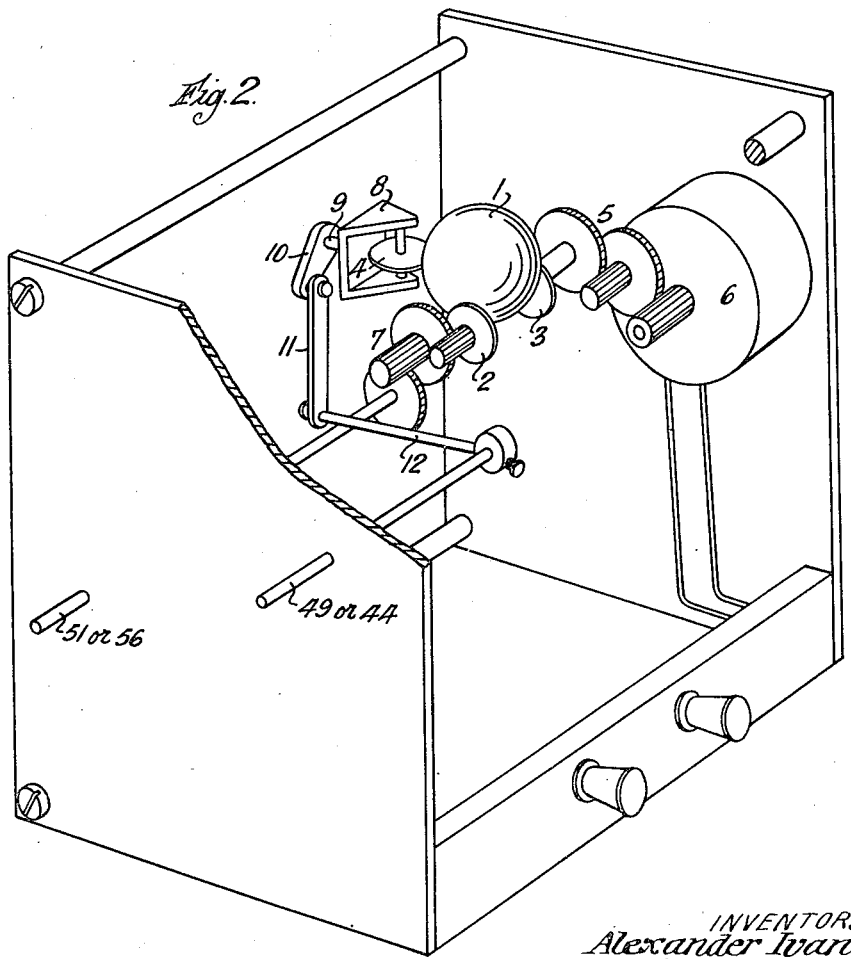
INVENTORS,
Alexander Ivanoff and
Giles Philip Eliot Howard
BY Baldwin & Wight
ATTORNEYS.

Patented Sept. 1, 1936

2,053,034

UNITED STATES PATENT OFFICE 2,053,034

METHOD OF AUTOMATIC CONTROL AND AUTOMATIC CONTROL APPARATUS

Alexander Ivanoff and Giles Philip Eliot Howard, Luton, England, assignors to George Kent Limited, London, England Application December 5, 1934, Serial No. 756,190
In Great Britain December 6, 1933

6 Claims. (Cl. 236—1)

This invention relates to the automatic control of a physical condition such as temperature, pressure, flow, or velocity.

The problem of the automatic regulation of a physical condition such as temperature, pressure, flow or velocity is considerably complicated by the variable period of lag which occurs between a movement of the regulating mechanism and the production of a corresponding change in the controlled condition. Moreover the sensitivity of the automatic control mechanism cannot be increased beyond a certain point without causing a self-sustained oscillation of the controlled condition.

The combined effect of the limited sensitivity and the time lag acts so to delay the counteracting of any disturbance in the controlled condition that a considerable deviation from the value desired may occur before the trend of the change of the controlled condition is reversed. While in some cases the extent of the temporary deviation is not of great importance in many instances it is desirable that the value of temporary deviation should be reduced to a minimum to obtain effective and reliable automatic control.

The main object of the present invention is to provide an apparatus which will operate automatically to reduce the deviation of a variable condition from a predetermined value.

According to the present invention the method of automatically maintaining a variable condition at or substantially at a predetermined value consists in applying to a device for regulating the condition a control effect dependent both upon a displacement itself dependent upon the rate of change of the condition and upon a velocity dependent upon the deviation of the condition from the predetermined value.

Apparatus for carrying the method into effect comprises means operating to produce a velocity dependent upon the deviation of the condition from the predetermined value, means operating to produce a displacement the extent of which is dependent upon the rate of change of the condition and a device for regulating apparatus controlling the value of the variable condition and which is subjected to a control effect depending upon the said velocity and displacement.

The invention is illustrated in the accompanying drawing in which Figure 1 is a diagrammatic view of control mechanism embodying the invention, and Figure 2 is a perspective view of a variable speed reversible drive mechanism. A bell crank lever 43 is mounted on a spindle 44 and is connected to a rod 45 moving in response to the deviation of the controlled condition. The lever 43 is connected by a link 46 to a lever 47 pivoted at 47' to a second lever 48 fast on a spindle 49, the angular displacement of which is utilized to vary the speed ratio of an infinitely variable reversible speed gear, the variable speed output spindle of which is connected to a spindle 51'. On this spindle is mounted an arm 51 which is connected by a link 50 to the lever 47. Thus, the arm 51 is driven at a variable speed which is controlled by the position of the spindle 49 and hence of the lever 48. In the arrangement shown, the distance between the pivotal connection 47' and the pivotal connection of the lever 47 to the link 50 is twice the distance between the latter pivotal connection and the pivotal connection of the lever 47 to the link 46. The lever 48 is also connected by a link 52 to a lever 53 pivoted at 54 to an arm 55 driven by a spindle 56 which itself is driven by a second infinitely variable reversible speed mechanism itself controlled by the angular position of the spindle 44. The lever 53 is also pivotally connected at 57 by a link 58 to some form of control valve or other control device.

The parts are so disposed that when the value of the condition being controlled is steady at the desired value, the rod 45 is stationary and the spindles 49, 44 are positioned to maintain the variable speed gears in their neutral position so that no rotation is imparted to the spindles 51' and 56. If now the value of the condition deviates from the desired value, the rod 45 will move at a rate dependent upon the rate at which the condition is deviating. Hence the lever 47 will also move about its connection to the link 50 at a rate dependent upon the rate of change of the condition and the lever 47 will cause, through the pivot 47', an angular displacement of the lever 48 at a corresponding rate about the spindle 49. The angular displacement of the lever 48 will, however, cause a similar displacement of the spindle 49 which in turn will cause the associated variable speed gear to transmit to the spindle 51' motion at a rate dependent upon the angular displacement of the spindle 49. The motion of the spindle 51' is transmitted through the arm 51 and the link 50 to the lever 47 and tends to move this lever 47 about the link 46 in such manner that the pivotal connection 47' is moved in the opposite sense to that due to the movement transmitted by the link 46 to the said pivotal connection 47'. If the rate of change of the condition remains constant, then a condition of equilibrium will be reached at which the speed of the link 50 is twice the speed of the link 46 so that in this condition of equilibrium the pivotal connection 47' is stationary at a position which is displaced, from its original position, through a distance dependent upon the rate of change. If the rate of change increases, then the rate of motion imparted from the link 46 to the lever 47 will increase and in consequence the speed of motion which will be transmitted from the spindle 51' will increase until a new position of equilibrium is reached and so on. If the rate of change is constantly changing, then of course the position of the pivotal connection 47' will constantly vary its displacement from its original position. When the rate of change begins to decrease the reverse operation will occur, and when the condition ceases to change (i. e., to have zero rate of change) the motion of the lever 43 will cease and, due to the displacement of the pivotal connection 47' and hence of the lever 48 from its original position, the spindle 51' will cause the lever 47 to move about the link 46 until the lever 48 and spindle 49 reach their original position at which time motion of the arm 51 will cease.

It will now be apparent that the link 52 which is connected to the lever 47 will at any time be moved or displaced to an extent which depends upon the rate of change of the condition and in consequence the lever 53 is moved angularly about its pivotal connection 54 to an extent dependent upon the rate of change. Simultaneously with the operation described the spindle 56 is caused to be driven at a rate which is controlled by the angular displacement of the spindle 44 and hence at a rate which depends upon the deviation of the condition from the desired value. This motion of the spindle 56 is, of course, partaken by the arm 55 and hence by the pivotal connection 54 between this arm 55 and the lever 53 so that the lever 53 moves about its connection to the link 52 at a rate dependent upon the deviation of the condition. Hence the pivotal connection 57 between the lever 53 and the link 58 is subjected to a control effect which depends upon the displacement of the lever 53 about the connection 54 in conjunction with the rate of movement of the lever 53 about its connection to the link 52. In other words, the control effect imparted to the rod 58 and thus to the control valve operated by the rod is dependent upon the conjoint effects of a displacement dependent upon the rate of change of the condition and a rate of movement dependent upon the deviation of the condition from the desired value.

The variable speed gear may be of any known type, and may, for example, consist of a sphere 1 supported by three rotatable discs 2, 3, and 4, two (2 and 3) of which are coaxial, one (3) being driven at a constant speed by a motor 6 through gears 5 and the other (2) being fast with, or as shown, geared by wheels 7 to the variable speed output spindle 51' or 56, while the third disc 4 is mounted on a bracket 8 fast with a spindle 9 having an arm 10 connected by a link 11 to an arm 12 carried on the spindle 49 or 44, the arrangement being such that the disc 4 is angularly movable to shift the orientation of the axis of rotation of the sphere and hence to vary the ratio of rotation between the constant speed disc and the other disc coaxial therewith.

In the operation of the mechanism, the ratio of rotation between the discs 2 and 3 is controlled by the angular position of the disc 4. It will be seen that by rocking the spindle corresponding to the spindle 49 or 44 the arm 12 causes the link 11 to operate to pivot a bracket 8 and hence to vary the angular setting of the disc 4 and in this way the speed of rotation imparted to the disc 2 through the sphere 1 from the disc 3 is varied, with, of course, a corresponding variation of the speed of the spindle corresponding to the spindle 51' or 56.

What we claim is:—

1. The method of automatically maintaining a variable condition at or substantially at a predetermined value, which consists in applying to a device for regulating the condition a control effect dependent both upon a displacement dependent on the rate of change of the condition and upon a velocity dependent upon the deviation of the condition from the predetermined value.

2. In apparatus for maintaining a variable condition at or substantially at a predetermined value, means operating to produce a velocity dependent upon the deviation of the condition from the predetermined value, means operating to produce a displacement the extent of which is dependent upon the rate of change of the condition, and a device for regulating the value of the variable condition and which is subjected to a control effect dependent upon the said velocity and displacement.

3. Control apparatus for automatically maintaining a variable condition at or substantially at a predetermined value and comprising means responsive to the deviation of the condition from the predetermined value, means responsive to the rate of change of the condition, a first member which is moved at a velocity dependent upon the response of the first responsive means, a second member which is displaced to an extent dependent upon the response of the second responsive means, and means operatively associated with a control valve or the like and operated on by both members.

4. Control apparatus for automatically maintaining a variable condition at or substantially at a predetermined value and comprising a device movable synchronously with change in the value of the variable condition, a floating lever, means connecting one point of the lever to the device, a variable speed device, means connecting the variable speed output side of the device to a second point of the lever, a first member controlling the variable speed output of the variable speed device, means connecting the member to a third point on the lever, the arrangement being such that the position of a predetermined point on the lever with respect to a datum position is representative of the rate of movement of the said movable device and hence of the rate of change of the variable condition, a second variable speed device which is regulated by the position of the said movable device with respect to a datum position, a further member displaced by the variable speed output side of the second variable speed device, a control device effecting control of the variable condition and means regulating the control device in dependence on the conjoint effect of the position of the said predetermined point and the speed of movement of the said further member.

5. Control apparatus as claimed in claim 4 and in which the first member is constituted by an arm which is pivotally connected at its outer end to the said third point and is fast with a spindle controlling the first variable speed device.

6. Control apparatus for automatically maintaining a variable condition at or substantially at a predetermined value and comprising a device movable synchronously with change in the value of the variable condition, a floating lever, means connecting one point of the lever to the device, a variable speed device, means connecting the variable speed output side of the device to a second point of the lever, a first member controlling the variable speed output of the variable speed device, means connecting the member to a third point on the lever, the arrangement being such that the position of a predetermined point on the lever with respect to a datum position is representative of the rate of movement of the said movable device and hence of the rate of change of the variable condition, a second variable speed device, which is regulated by the position of the said movable device with respect to a datum position, a further member displaced by the variable speed output side of the second variable speed device, a control device effecting control of the variable condition, a second floating lever, means connecting one point of the second lever to the further member, means connecting a second point of the said lever to the said predetermined point of the first floating lever, and means connecting the control device to a third point of the second floating lever.

ALEXANDER IVANOFF.
GILES PHILIP ELIOT HOWARD.